United States Patent [19]

Kofod

[11] Patent Number: 4,884,862
[45] Date of Patent: Dec. 5, 1989

[54] FIBER OPTIC FAN-OUT MODULE
[75] Inventor: Mogens Kofod, Howell, N.J.
[73] Assignee: Minnesota Mining and Manufacturing Company, St. Paul, Minn.
[21] Appl. No.: 258,840
[22] Filed: Oct. 17, 1988
[51] Int. Cl.⁴ .............................................. G02B 6/36
[52] U.S. Cl. .............................. 350/96.20; 350/96.23; 174/76; 174/89
[58] Field of Search ............... 350/96.20, 96.21, 96.22, 350/96.23; 174/76, 89; 439/449

[56] References Cited
U.S. PATENT DOCUMENTS

| 4,737,010 | 4/1988 | Le Maitre et al. | 350/96.20 |
| 4,772,081 | 9/1988 | Borgos et al. | 350/96.20 |
| 4,795,230 | 1/1989 | Garciía et al. | 350/96.20 |

FOREIGN PATENT DOCUMENTS

| 206105 | 6/1955 | Australia | 174/76 |
| 82851 | 6/1957 | Denmark | 174/76 |
| 31131 | 9/1920 | Norway | 174/76 |

Primary Examiner—Frank Gonzalez
Attorney, Agent, or Firm—D. M. Sell; W. N. Kirn; S. W. Buckingham

[57] ABSTRACT

A fiber optic fan-out module has a channel for receiving a fiber optic cable and a groove adjacent the channel for receiving protective filaments from the cable. The module further has an anchor block with a passage therethrough for receiving a loose protective sleeve assembly. The anchor block has a groove for receiving protective filaments from the sleeve assembly.

11 Claims, 2 Drawing Sheets

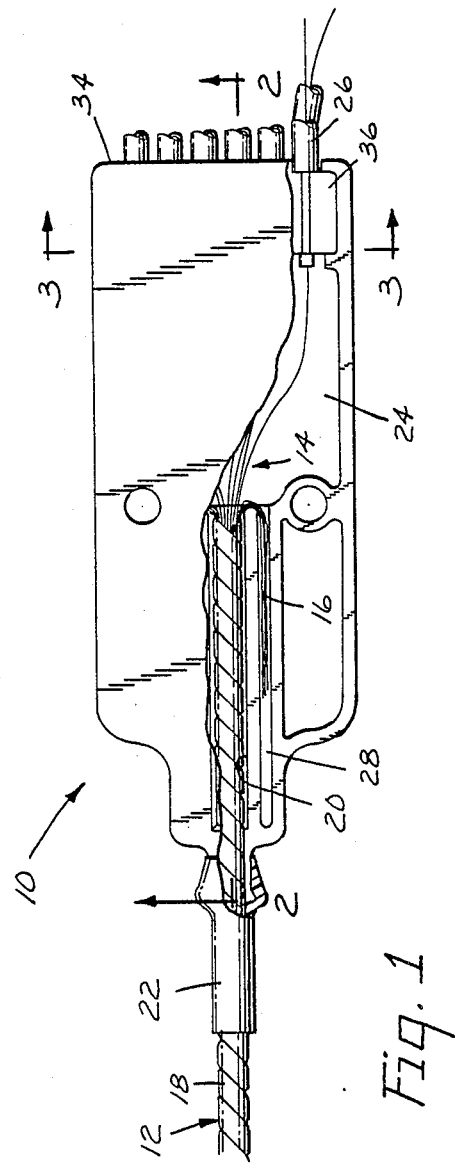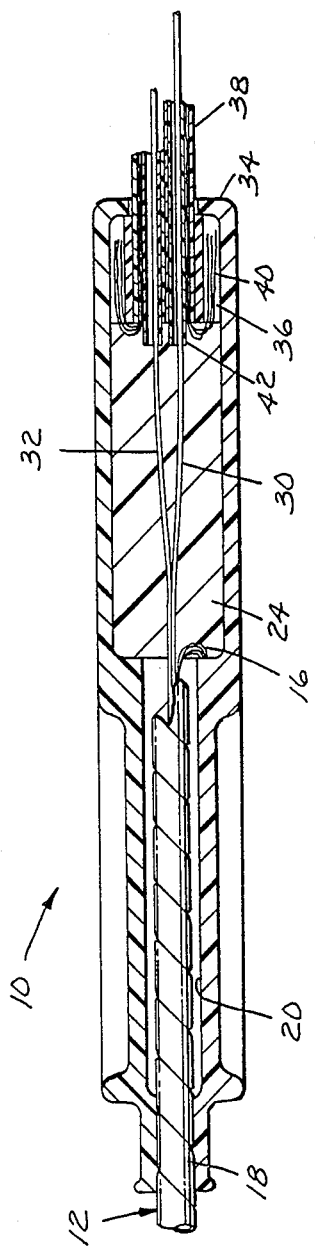

4,884,862

FIBER OPTIC FAN-OUT MODULE

FIELD OF THE INVENTION

The present invention relates to fan-out modules for use with fiber optic cables.

BACKGROUND OF THE INVENTION

Optical fibers tend to be very fragile and great care must be taken in handling them. This is particularly true of the glass fibers that provide the low loss and high quality transmissions required in communications applications. One technique used to protect optical fibers is to bundle several of them in a single cable. Such a cable may be a flat linear array of fibers held together by a web. Such a cable is known as a ribbon cable. Even greater protection is offered by spiral wound cables. In a spiral wound cable several fibers are bundled together and surrounded by filaments of a protective material such as an aramid fiber. The optical fibers and the protective material are retained by a spiral wrapping.

One problem with using such cables is that the fibers must fan out from the cable to reach their ultimate destinations. The area around such a fan out is subject to greater stresses that are other areas of the fiber. Such stresses could result in fiber breakage. In order to protect the fibers in the fan-out area, the fan out is often placed in a housing. The fibers enter the housing in the cable, are fanned out and exit in loose protective coverings. Some prior art fan-out modules simply bonded the incoming cables and the outgoing fibers, in their protective loose coverings, to the module at the entrance and the exit. This approach provides little protection against shock to the housing, as such shocks are transmitted to the fibers, and provides almost no strain relief for pulling forces on the cable or the fibers.

A second type of fan-out module embeds the entire interior of the module in a settable potting compound such as an epoxy. The fibers are thus held rigidly inside the housing. This provides somewhat better shock resistance and strain relief than the first type of fan-out module, but less than is desirable in a typical operating environment.

SUMMARY OF THE INVENTION

In the fan-out module of the invention a housing has a channel in a first end for receiving a fiber optic cable that includes a plurality of optical fibers and protective filaments within a retainer. A groove for receiving the protective filaments is provided adjacent the channel. An anchor block with a passage therethrough is positioned in an opening in a second end of the housing. The passage is provided to receive a loose protective sleeve with protective filaments therein. The anchor block has a groove on a first edge adjacent the passage to receive the protective filaments from the sleeve.

BRIEF DESCRIPTION OF THE DRAWINGS

FIG. 1 is a top view of a fan-out module according to the invention;

FIG. 2 is a cross-sectional side view of a fan-out module according to the invention.

DETAILED DESCRIPTION OF A PREFERRED EMBODIMENT

Figure 3:
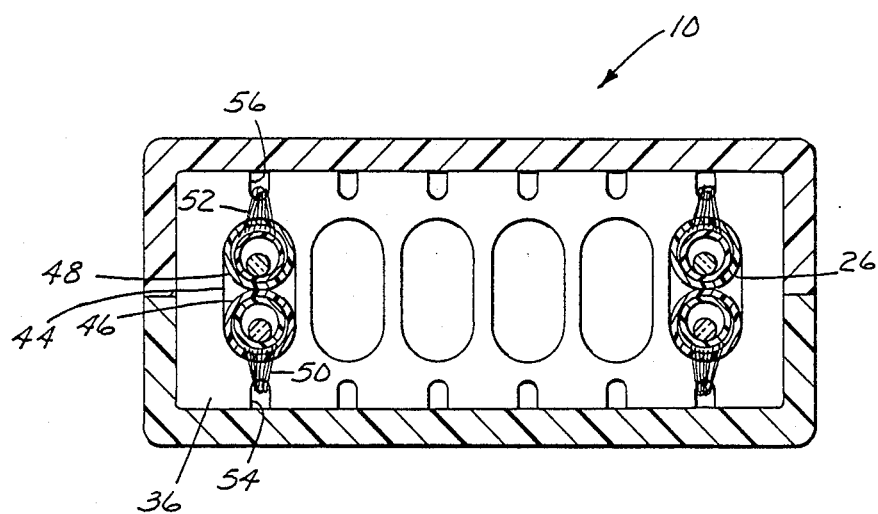
FIG. 3 is a cross-sectional end view of a fan-out module according to the invention.

FIG. 1 is a top view of a fan-out module, 10, according to the invention. A portion of the top of module 10 is cut away to show the interior. A fiber optic cable, 12, is shown entering module 10. Cable 12 includes a plurality of optical fibers, 14, a plurality of protective filaments, 16, and a spiral wrapping, 18, to retain the optical fibers and the protective filaments. Protective filaments 16 are typically aramid fibers. Cable 12 enters module 10 through a channel, 20. Cable 12 could be bound to channel 20 by an adhesive, but in the preferred embodiment it lies loosely therein. A flexible member, 22, surrounds cable 12 adjacent the point of entry into module 10. Flexible member 22 prevents sharp bends of cable 12 near module 10. Such sharp bends could break the optical fibers.

Spiral wrapped retainer 18 ends inside module 10. Optical fibers 14 and protective filaments 16 continue beyond the end of retainer 18, however. Optical fibers 14 are fanned out in a cavity in module 10. They are inserted into loose, protective sleeve assemblies such as protective sleeve assembly 26, and exit module 10.

Module 10 has a groove, 28, adjacent channel 20. Protective filaments 16 are placed in groove 28 and held there with an adhesive. Preferably, the adhesive is an epoxy adhesive. Binding protective filaments 20 in groove 28 provides strain relief for cable 12.

FIG. 2 is a cross sectional side view of module 10 along section lines 2 of FIG. 1. Optical fibers from cable 12, such as fibers 30 and 32 are fanned out in chamber 24. As shown in FIG. 2 chamber 24 is filled with a resilient shock absorbing material. Preferably the resilient material is a silicone gel. This helps to protect the fragile fibers from shocks caused by impacts to module 10.

End 34 of module 10 has an anchor block, 36. Anchor block 36 has openings into which loose tube assemblies are inserted. A, typically loose, sleeve tube assembly includes an outer tube, 38, protective filaments, 40, and an inner tube, 42. As with protective filaments 16 of FIG. 1, protective filaments 40 are preferably aramid fibers. Optical fiber 30 is inserted into inner tube 42 to protect fiber 30 in the environment outside of module 10. One such loose sleeve assembly is provided for each fiber to be fanned out.

FIG. 3 is a cross-sectional end view of module 10 along section lines 3 of FIG. 1. As shown in FIG. 3 anchor block 36 is mounted in module 10. Anchor block 36 has a plurality of passages such as passage 44. Passage 44 has loose tube assemblies 46 and 48 passing therethrough. Loose sleeve assemblies 46 and 48 have protective filaments 50 and 52, respectively. Anchor block 36 has grooves 54 and 56 adjacent passage 44. Protective filaments 50 are positioned in groove 54 and held there by an adhesive. Preferably an epoxy adhesive is used. Similarly protective filaments 52 are positioned in groove 56 and held there by an adhesive. Binding the protective filaments in the grooves provides strain relief similar to that provided by binding protective filaments 16 in groove 28 of FIG. 1.

I claim:

1. A fiber optic fan-out module comprising:
   a housing having first and second ends, said housing having a channel in said first end for receiving a fiber optic cable having a plurality of optical fibers and protective filaments contained within a retaining means, and a groove adjacent said channel for receiving said protective filaments from said cable and said housing further having an opening in said second end for allowing the individual optical fibers of said cable exit said housing; and an anchor block in said opening in said second end, said anchor block having first and second edges and having a passage through said anchor block for allowing optical fibers in loose protective sleeves containing protective filaments to exit said housing, said anchor block having a groove in said first edge adjacent said passage for receiving said protective filaments from said sleeve.

2. The fiber optic fan-out module of claim 1 further comprising:

a cable containing a plurality of optical fibers and protective filaments inside a retaining means, said cable being in said channel and said retaining means having an end in said housing, said protective filaments extending beyond said end of said retaining means and being held in said groove adjacent said channel by an adhesive, at least one of said fibers extending beyond said end of said retaining means; and a protective sleeve containing protective filaments in said passage, said protective sleeve having an end in said housing, said protective filaments extending beyond said end of said sleeve, said filaments being held in said groove in said anchor block by an adhesive, and one of said optical fibers being inserted into said sleeve to exit said housing in said sleeve.

3. The fiber optic fan-out module of claim 2 wherein both of said adhesives are epoxy adhesives.

4. The fiber optic fan-out module of claim 2 wherein said protective filaments are aramid fibers.

5. The fiber optic fan-out module of claim 2 further comprising a resilient shock absorbing gel in said housing.

6. The fiber optic fan-out module of claim 5 wherein said resilient gel is a silicone gel.

7. The fiber optic fan-out module of claim 2 wherein said anchor block has a groove in said second edge and further comprising a second protective sleeve containing protective filaments in said passage, said second protective sleeve having an end in said housing, said protective filaments extending beyond said end of said second sleeve, said filaments being held in said groove in said second edge by an adhesive, and one of said optical fibers is inserted into said second sleeve to exit said housing in said second sleeve.

8. The fiber optic fan-out module of claim 7 wherein all of said adhesives are epoxy adhesives.

9. The fiber optic fan-out module of claim 7 wherein said protective filaments are aramid fibers.

10. The fiber optic fan-out module of claim 7 further comprising a resilient shock absorbing gel in said housing.

11. The fiber optic fan-out module of claim 10 wherein said resilient gel is a silicone gel.

* * * * *